United States Patent [19]

Haynes et al.

[11] 4,098,229
[45] Jul. 4, 1978

[54] SELF-CONTAINED, PORTABLE ANIMAL COMMODE

[76] Inventors: Dennis C. Haynes, 513 W. 31st St., Erie, Pa. 16508; Richard G. Sins, 2914 Reed St., Erie, Pa. 16504

[21] Appl. No.: 692,863

[22] Filed: Jun. 4, 1976

[51] Int. Cl.² ............................................. A01K 29/00
[52] U.S. Cl. ..................................................... 119/1
[58] Field of Search .................... 119/1, 19, 17, 22; 198/823

[56] References Cited

U.S. PATENT DOCUMENTS

| | | | |
|---|---|---|---|
| 2,430,282 | 11/1947 | Ensinger | 198/823 |
| 2,883,963 | 4/1959 | Scott | 119/1 |
| 3,227,138 | 1/1966 | Cambell | 119/1 |
| 3,791,348 | 2/1974 | Marnett | 119/19 |
| 3,793,988 | 2/1974 | Traeger | 119/1 |
| 3,871,331 | 3/1975 | Breau | 119/1 |

*Primary Examiner*—Russell R. Kinsey
*Assistant Examiner*—G. Lee Skillington
*Attorney, Agent, or Firm*—Strauch, Nolan, Neale, Nies & Kurz

[57] ABSTRACT

A self-contained, portable animal commode including a base with a waste holding tank and a top pivoted to the base, the top including an end vertical panel, for satisfying a male dog's natural urinating instincts, and a platform underlying a movable belt upon which the animal stands to urinate and defecate. After the animal steps off the commode, the belt is rotated forwardly to deposit waste in the tank while, simultaneously, the end panel and belt are flushed of waste. Then the belt is reversely driven to its initial position, the belt being wiped clean when moved in both directions.

5 Claims, 9 Drawing Figures

SELF-CONTAINED, PORTABLE ANIMAL COMMODE

BACKGROUND OF THE INVENTION

The invention related generally to animal toilets and more particularly to pet commodes.

The problem of safe and convenient disposal of pet excreta, particularly dog and cat wastes, has become rather critical, particularly in urban areas. It is highly undesirable and, in some locales, illegal to permit one's dog or cat to defecate out of doors.

Attempts at a solution to the problem began with some sort of indoor pet toilet facility. These have met with some degree of success in the case of cats but virtually none at all in the case of dogs. Early attempts include permanent installations connected to the plumbing system of a dwelling both for supply of flushing water and deposit of waste into a sanitary sewer system. Besides the expense involved, such systems just are not practical. Examples of such units are disclosed in prior U.S. Pat. Nos. 2,204,416; 3,318,285; 3,324,828 and 3,747,563. A similar unit designed for outdoor installation is disclosed in U.S. Pat. No. 3,276,427. A more exotic development including a pet shower and arranged for connection to a standard bathroom sink and toilet for supply of water and discharge of waste respectively is disclosed in U.S. Pat. No. 3,793,987.

The lack of success of these and other similar devices led to the development of less expensive and easier to use portable units, most of which comprise full enclosures for the pet, such as disclosed in U.S. Pat. Nos. 3,039,783 and 3,871,331. More open enclosures are disclosed in U.S. Pat. Nos. 3,793,988 and 3,842,803, the former including a platform supported endless belt upon which the animal stands to defecate and/or urinate, the latter also having lateral side walls and a floor washed automatically after use. A completely open device is disclosed in U.S. Pat. No. 3,937,182 which may be quite useful for cats but makes no provision to satisfy the natural instincts of a male dog, which is to urinate on a vertical surface or column after lifting one or the other of its hind legs.

What is not disclosed in the prior art hereinbefore discussed is a self-contained, portable animal commode of inexpensive construction which is attractively styled, and open enough to encourage pets such as dogs to use the commode without being discomforted by an enclosed feeling which is imparted by the prior art devices. Additionally, the prior art above fails to disclose an animal commode having an easily opened top to permit access to and removal of a waste matter tank, the upper portion of the commode also having an end wall for satisfying the natural urination instincts of male dogs, a washing system for the panel, automatically activated after use by the pet, and a cleaning system for a platform — supported endless belt upon which the animal stands to deposit excreta which includes a first wiper for cleaning the belt when it is rotated in one direction and a second wiper, engageable with the surface of the belt when the belt is returned to its initial position, ready for subsequent use.

OBJECTS OF THE INVENTION

Therefore, it is a principal object of the invention to provide a self-contained, portable animal commode including a pivotal top and end wall assembly whereby a waste disposal tank therebeneath is easily accessible for periodic removal and disposal of its contents.

It is another object of the invention to provide a portable animal commode having a completely open configuration in order not to impart a closed in feeling to the animal using the commode, the commode having one end wall to satisfy the natural urination instinct of male dogs and the like.

It is a further object of the invention to provide a portable animal commode having a platform supported endless belt for the animal to stand on and a pair of wiper blades to thoroughly clean the belt after use, in response to movement of the belt, one of which is activated to clean the belt as it is returned to an initial position, ready for subsequent use.

Yet another object of the invention is to provide a portable animal commode having a platform supported endless belt for deposit of excreta thereon, together with a pair of channel members to form the belt into a trough so that excreta does not run over the sides of the platform but is directed into a waste holding tank located beneath the platform.

Yet a further object of the invention is to provide a portable animal commode including a vertical, end panel to satisfy the natural urination instinct of a male dog together with a washing system to direct a flow of cleaning liquid downwardly across the panel after the animal leaves the commode.

Still another object of the invention is to provide automatic control means for a portable animal commode which is set into operation after the animal leaves the commode to efficiently clean surfaces upon which excreta has been deposited and ready the commode for subsequent use.

Still a further object of the invention is to provide an attractively styled fully self-contained, portable animal commode of simplified construction to thus reduce costs of manufacture.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings in which.

DESCRIPTION OF THE PREFERRED EMBODIMENT

Figure 1:
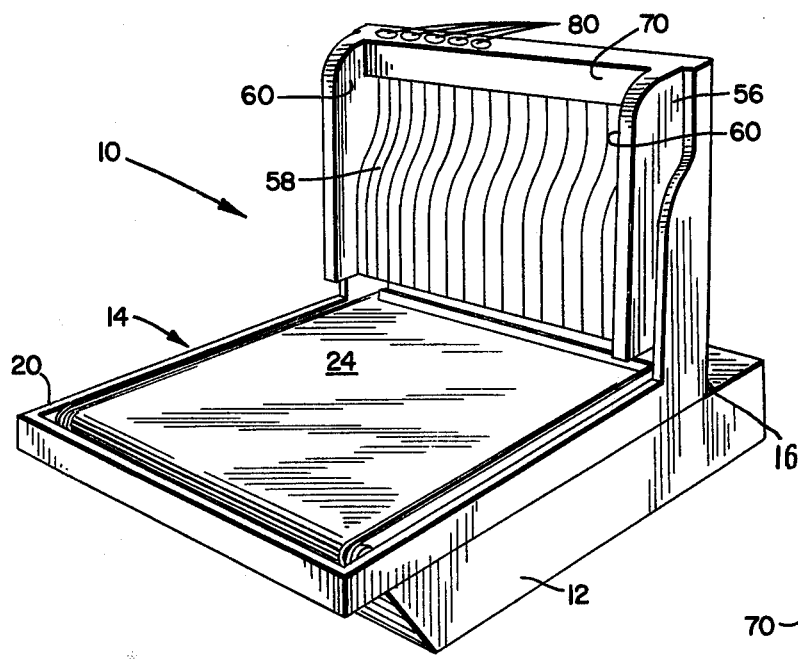
FIG. 1 is a perspective view of the portable animal commode.
Figure 5:
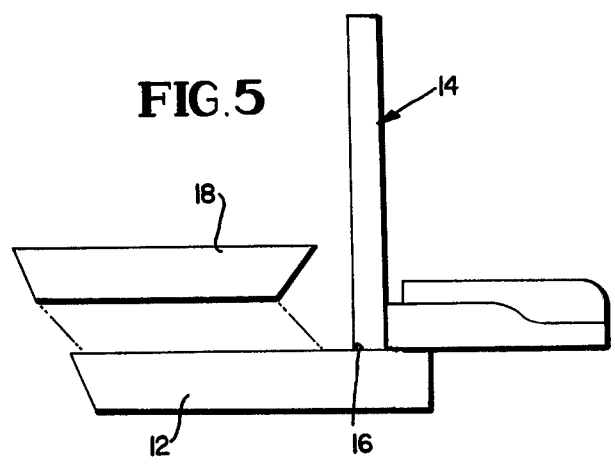
FIG. 5 is a diagrammatic view showing opening of the animal commode to facilitate removal of a waste tank therefrom, and drawn to a reduced scale.
Figure 6:
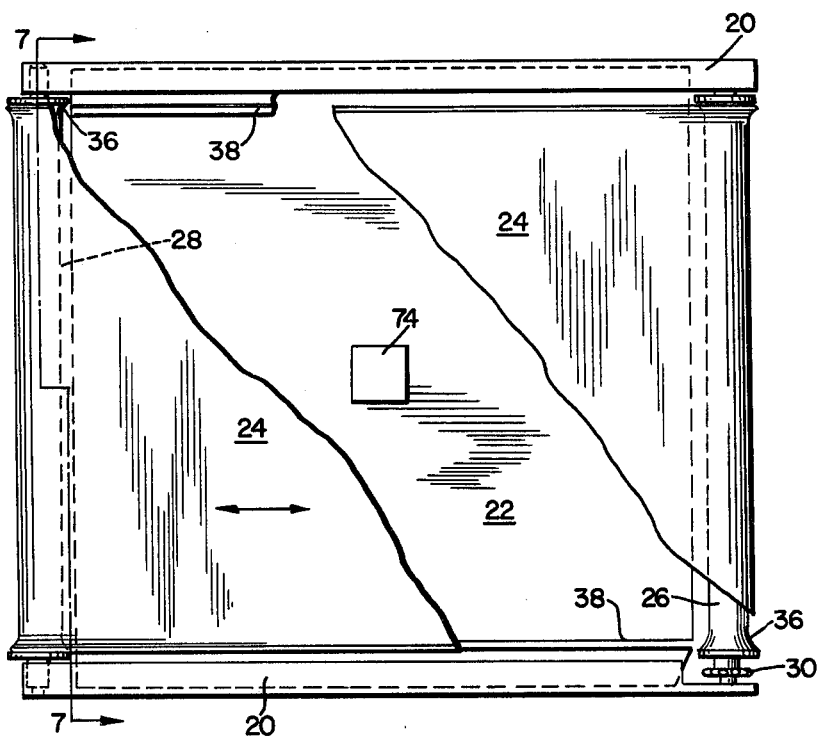
FIG. 6 is a plan view of the platform supported endless belt of the animal commode, parts being broken away to reveal interior detail.
Figure 7:
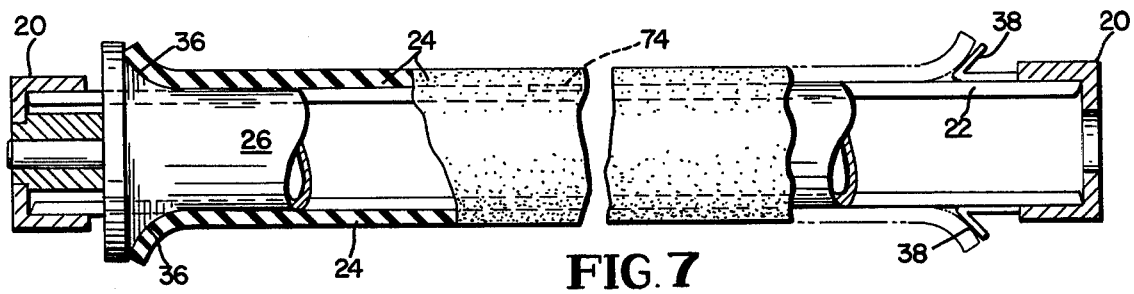
FIG. 7 is a section view taken along lines 7—7 of FIG. 6, and drawn to an enlarged scale.

The animal commode 10 includes a generally tray shaped base section 12 and an upper platform and end section 14 which is pivotally mounted on one end of tray or base 12 by a full width hinge such as is indicated at 16 (FIG. 1). A tank 18 for holding animal wastes is located within the base 12 and is easily removed therefrom for disposal of accumulated waste when assembly 14 is opened, as is shown in FIG. 5. Base 12 is extended as illustrated at 15 so that the entire assembly is prevented from tipping over backwards when assembly 14 is opened. Of course, tank 18 may include a chemical solution for eliminating odors and additionally for partially breaking down waste products deposited therein. Such chemical solutions are entirely conventional and commonly available commercially and thus do not need to be discussed in any detail.

Figure 8:
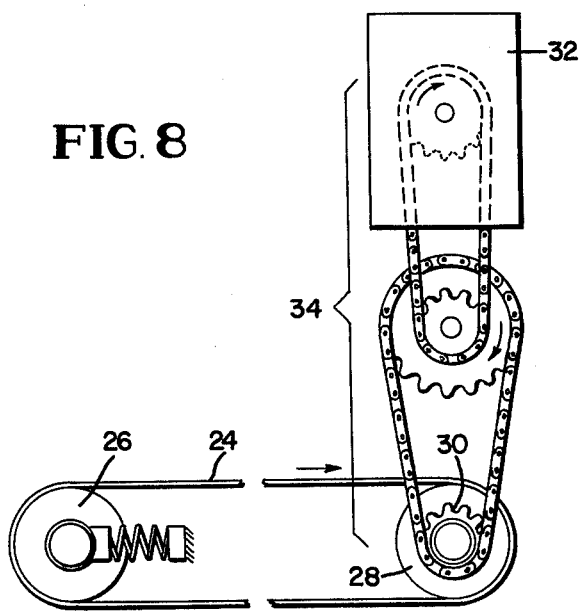
FIG. 8 is a diagrammatic elevation view of the drive system for the endless belt of the animal commode.

The forward end of assembly 14 is formed into a platform frame 20 further having a solid platform 22 extending thereacross for supporting the weight of an animal when he stands on the commode. An endless belt 24 is located over platform 22 and is trained over a pair of rollers 26,28, one of which includes a sprocket 30 (FIG. 8) for positive drive of the belt from a motor 32 (FIGS. 3 and 8) through suitable reduction chain and sprocket gearing 34, shown in FIG. 8. Belt 24 receives the animal's excreta during use. In order to prevent the excreta from flooding or falling over the sides of belt 24, and direct it instead to tank 18 each lateral end of both rollers 26,28 is curved as shown at 36 and angled rails 38 are provided along the open side edges of endless belt 24 to form the belt into a trough. Belt 24 may be made of neoprene or other suitably resilient material so that it may be trough-shaped as set forth. Additionally, platform 22 as well as the upper run 40 of endless belt 24 are tilted or inclined towards the rear side of the commode as illustrated best in FIG. 3. Thus, the excreta can only go in the rearward direction when belt 24 is stationary.

After use by the animal, belt 24 is driven in the direction of arrow 42 (FIG. 9) so that excreta may fall into tank 18. Excreta remaining on belt 24 is scraped therefrom by a wiper blade 44 made of neoprene or similar material whereupon it falls into tank 18. Blade 44 is mounted upon the leading edge of a top cover 46 of tank 18.

After belt 24 has been driven through about one half a revolution, so that upper run 40 is entirely underneath platform 22 and thus its entire surface has been cleaned by wiper blade 44, belt 24 is reversely driven in the direction of arrow 48 to an initial position, ready for subsequent use by an animal. As belt 24 is reversely driven, a second wiper blade 50 (FIG. 9) is lowered by activating a solenoid 52 acting on lever arm 54 to move arm 54 and blade 50 to the solid line position shown in FIG. 9 so that any excreta possibly remaining on belt 24 is easily scraped therefrom as the belt returns to its initial position with upper run 40 entirely above platform 22. Also simultaneously with timer and pump operation, wiper blade 50 is lifted from belt 24 so that waste can pass thereby into tank 18.

Figure 2:
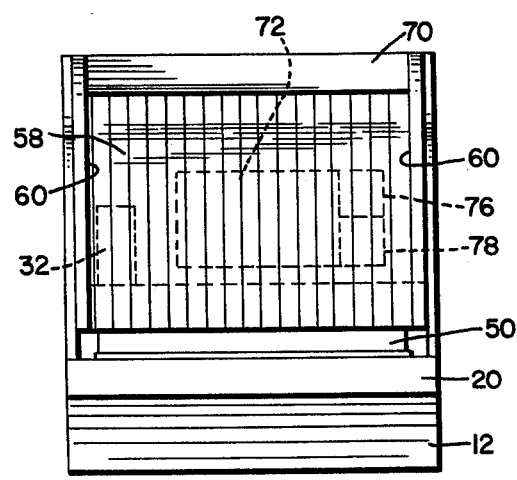
FIGS. 2 and 3 are respective front end and side elevation views of the animal commode as illustrated in FIG. 1.
Figure 4:
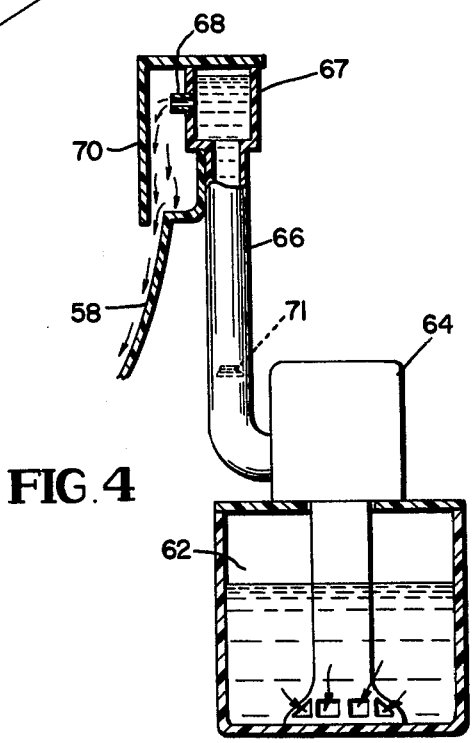
FIG. 4 is a partial detail elevation view of the animal commode cleaning system.
Figure 9:
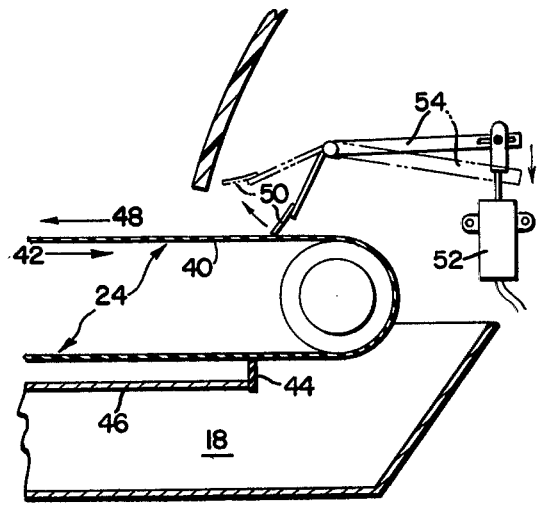
FIG. 9 is a detail, elevation view showing the cleaning wiper blades for the endless belt of the animal commode.

Turning now to FIGS. 2 and 4, the end wall 56 of assembly 14 and its components will be discussed in detail. End wall 56 is so constructed to conveniently house all of the controls, belt drive motor, and flushing system to thus compact and simplify construction of the entire commode. A curved wall or panel 58 serves to satisfy the natural urination instinct of male dogs, a pair of splash guards 60,60 being provided at each side of panel 58 to confine urine to the commode. A flushing system is illustrated in FIG. 4 and includes a sealed, elongate reservoir tank 62 having a supply of cleaning liquid therein. Reservoir 62 is sealed is shown in FIG. 5 to retain its contents when unit 14 is tipped to remove tray 18 as shown in FIG. 5. The rest of the components of the flushing system include a high volume, sump pump 64, in reservoir 62, a pump outlet line 66, a distribution maniford 67 communicated with line 66 and arranged across the entire upper end of panel 58, a number of nozzles 68 for directing the liquid outwardly from panel 58, and a diffuser panel 70 upon which liquid impinges and is directed back onto the top of panel 58. A check valve 71 may be provided in line 66 to retain a head of liquid within distribution manifold 67. Thereafter, the liquid cascades in waterfall fashion down the surface of panel 58, to cleanse it of urine, and onto the rearward end of belt 24 which is disposed immediately therebeneath, as shown in FIG. 9. The panel flushing system just described is conveniently simultaneously actuated with the rotation of belt 24 in the direction indicated by arrow 42 so that the cleansing liquid also serves to assist the cleaning of belt 24 of fecal matter and/or urine.

If desired, a commercially available essence may be applied to the commode so that the animal (particularly a dog) will recognize the commode as being a suitable place for evacuation.

The various controls for activating the entire commode in response to an animal using the same will now be discussed in detail. Conveniently, a housing 72 may be provided in wall 56 for most of the control circuitry and switches. A switch 74 beneath belt 24 is depressed to a ready state when the animal mounts the platform. When the animal dismounts the platform, switch 74 then closes a relay 76 which starts a timer 78 (FIG. 2). After a preset delay of from 15 to 30 seconds, motor 32 for belt 24 is activated to move belt 24 in the direction indicated by arrow 42 (FIG. 9) and, simultaneously, pump 64 is activated for about 5 seconds to cause a charge of cleansing liquid to cascade down panel 58 onto belt 24. This seemingly very small 5 second supply of cleansing liquid has been found to be an entirely sufficient quantity to adequately cleanse both panel 58 and belt 24 after use. Since such a small quantity is required for each flush, it is seen that the commode may go through a large number of cycles of operation without need of any attention. Also simultaneously with timer and pump operation, wiper blade 50 is lifted from belt 24 so that waste can pass thereby into tank 18. About 30 seconds is required to drive belt 24 so that its entire upper run 40 is beneath platform 22 and has been scraped clean by wiper blade 44.

Thereafter, wiper blade 50 is lowered onto belt 24 by solenoid 52 as belt 24 is reversely driven in the direction indicated by arrow 48 to an initial position, ready for subsequent use. Thus, belt 24 is scraped clean again of any waste which was not removed by wiper blade 44. When the initial position of belt 24 is reached, motor 32 is stopped and wiper blade 50 remains in its position on the belt.

Figure 3:
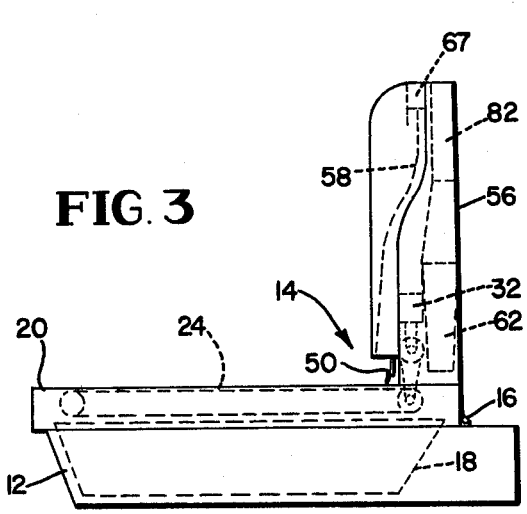

A series of pilot lights 80 may be provided on the upper rear section of wall 56 to indicate the duty cycle of the commode and the level of cleaning liquid (which may be simply plain water) remaining in reservoir 62. An accessory rack may be provided in the rear of wall 56 at 82 (FIG. 3).

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An animal commode comprising a base structure, a waste holding receptacle located in said base structure and being removable therefrom, a unitary platform and end wall assembly pivotally mounted on said base structure, said assembly normally being disposed to position said platform over said receptacle and pivotal away therefrom for periodic removal of said receptacle and disposal of its contents, an endless belt having an upper run arranged over said platform for an animal to stand thereupon and a lower run disposed between said platform and said receptacle, drive means for said belt mounted in said end wall for moving said belt in one direction to transfer waste thereon to said receptacle and to reversely drive said belt to return the same thereto to the initial position for subsequent use by an animal, a generally vertically disposed panel mounted in said end wall rearwardly of said platform, the lower edge of said panel being disposed above said belt, a liquid reservoir in said end wall, a distribution manifold adjacent the upper end of said panel for directing liquid across the full width of said panel adjacent the upper end thereof, a pump mounted in said end wall for pumping liquid from said reservoir to said distribution manifold, and belt cleaning means comprising a first wiper blade carried by said end wall and selectively engagable with the upper run of said belt and a second wiper blade engagable with the lower run of said belt.

2. The animal commode as claimed in claim 1 wherein said platform further comprises means for forming the upper run of said belt into a trough whereby waste deposited thereon will be channeled to flow along said belt in said one direction.

3. The animal commode as claimed in claim 1 where said end wall further comprises a pair of vertical splash shields on the vertical ends of said panel.

4. The animal commode according to claim 1 together with means for moving said first wiper blade out of contact with said belt as said belt is moved in said one direction and to move said first wiper blade into contact with said belt as said belt is reversely driven.

5. The animal commode as claimed in claim 1 further comprising electric switch and control means activated by an animal dismounting said platform, said electric switch and control means comprising means for activating said drive means to move said belt in said one direction and for simultaneously actuating said pump and for reversely driving said belt after said cessation of the operation of said pump.

* * * * *